United States Patent [19]

Hongo

[11] Patent Number: 5,027,772
[45] Date of Patent: Jul. 2, 1991

[54] ENGINE KNOCK CONTROL SYSTEM

[75] Inventor: Shigeatsu Hongo, Saitama, Japan

[73] Assignee: Fuji Jukogyo Kabushiki Kaisha, Tokyo, Japan

[21] Appl. No.: 533,337

[22] Filed: Jun. 5, 1990

[30] Foreign Application Priority Data

Jun. 8, 1989 [JP] Japan .................................. 1-67845

[51] Int. Cl.$^5$ ............................................. F02P 5/155
[52] U.S. Cl. ..................................... 123/421; 123/425
[58] Field of Search ................. 123/421, 424, 425, 602

[56] References Cited

U.S. PATENT DOCUMENTS

| 4,005,688 | 2/1977 | Kawai et al. | 123/421 X |
| 4,117,820 | 10/1978 | Kashiwazaki et al. | 123/421 |
| 4,458,646 | 7/1984 | Suzuki et al. | 123/424 X |
| 4,856,481 | 8/1989 | Kamise et al. | 123/425 |

Primary Examiner—Tony M. Argenbright
Attorney, Agent, or Firm—Beveridge, DeGrandi & Weilacher

[57] ABSTRACT

The generation of knocking in an engine is controlled by an engine knock control system, which comprises circuit such as a magneto for generating a reference signal in synchronous with a rotation of the engine and an ignition circuit responsive to the reference signal for controlling electric supply to an ignition coil of the engine to ignite the engine. The control system further includes an ignition control circuit for maintaining an ignition timing to a second angle retarded with respect to the reference from the reference signal generating circuit when the knocking in the engine is detected by the knock sensor and for returning the ignition timing to a first angle corresponding to the reference signal when the temperature of the engine becomes below a predetermined temperature. For this purpose, the ignition control circuit is composed of a temperature discriminating circuit connected to a temperature sensor for detecting an engine temperature, a knock detecting circuit connected to the knock sensor for detecting knocking in the engine, and a switching circuit connected to the reference signal generating circuit and the ignition circuit.

6 Claims, 2 Drawing Sheets

ENGINE KNOCK CONTROL SYSTEM

BACKGROUND OF THE INVENTION

The present invention relates to a knock control system of an industrial engine, and more particularly, to an engine knock control system provided with a capacitive discharge type ignition device for detecting knocking in industrial engine and for controlling an ignition timing of the engine.

In a four-cycle engine with an ignition device using a battery, it is well known that in order to avoid knocking due to abnormal burning of fuel, the knocking in the engine is detected by means of a knock sensor and a signal representing the generation of the knocking is transmitted therefrom to the ignition device to thereby retard the ignition angle or the ignition timing.

On the other hand, in a two-cycle engine, an electrode of an ignition plug is contaminated by oil contained in air-fuel mixture, causing misfiring. Accordingly, there has been widely utilized a capacitive discharge type ignition device (CDI) having a large initial discharge energy.

In the CDI, as is well known, a capacitor connected to a primary side of an ignition coil is charged by a relatively large voltage, for example, of 400 V and is discharged by a switching element such as a thyristor with a predetermined timing to generate a secondary voltage having a large initial discharge energy on a secondary side of the ignition coil. When the battery is utilized as a power source, it is necessary to have a A.C.-D.C. converter, thus increasing the cost. Accordingly, despite this defect, the CDI in which a magneto requiring less cost is utilized as the power source has been used in practice.

However, the CDI including the magneto as the power source discharges the capacitor by turning the thyristor on in response to a signal from a coil provided for the magneto, so that ignition is carried out in accordance with a fixed ignition timing, thus making it difficult to easily change the ignition timing.

In order to obviate the above defect, the Japanese Patent Laid-open No. 56-92357 discloses technology in which a trigger signal of the thyristor is advanced or retarded in angles from a signal generated in the coil of the magneto by an ignition timing computing means including an integrator comprising a capacitor and an amplifier in response to output of a thermistor for detecting a temperature of an engine oil.

However, according to this prior art, in a case where the knock sensor is used in place of the thermistor and the output of the knock sensor is input into the ignition timing computing means through the integrator, the ignition timing of the CDI can be retarded when the knocking is detected, but the ignition timing immediately advances in angle to the original ignition timing when the knocking is extinguished.

During such an operation, the ignition timing is frequently advanced or retarded repeatedly, resulting in lowering the durability of the engine and causing engine torque change, thus making the engine unstable in operation.

In order to obviate these defects in the prior art, it will be required to utilize a complicated circuit arrangement, resulting in the cost increase even in the usage of the CDI.

SUMMARY OF THE INVENTION

An object of the present invention is to substantially eliminate the defects or drawbacks encountered in the prior art described above and to provide an engine knock control system capable of realizing engine knock control without causing engine torque change due to frequency change of ignition timing and providing a simple structure with an improved engine durability.

This and other objects can be achieved according to the present invention by providing a system for controlling knocking in an engine comprising means for generating a reference signal in synchronism with a rotation of the engine, ignition means responsive to the reference signal for controlling electrical supply to an ignition coil of the engine to ignite the engine, a knock sensor for detecting knocking in the engine, a temperature sensor for detecting a temperature of the engine, and ignition control means for maintaining an ignition timing to a second angle retarded with respect to the reference signal from the reference signal generating means when the knocking in the engine is detected by the knock sensor and for returning the ignition timing to a first angle corresponding to the reference signal when the temperature of the engine falls below a predetermined temperature.

According to the engine knock control system of the character described above, when the generation of the knocking is detected by the knock sensor, the trigger signal for the thyristor of the ignition means is generated with the angle retarded with respect to the reference signal generated from the reference signal generating means, i.e. the magneto, whereby the ignition timing is retarded and this condition is maintained. On the other hand, when the temperature of the engine falls below the predetermined temperature, and which is detected by the temperature sensor, the trigger signal is switched to the reference signal from the reference signal generating means, whereby the ignition timing returns to the original state.

Accordingly, in a case where the knocking of the engine is detected and controlled, the ignition timing returns from the ignition timing with the retarded angle in response to the engine temperature having a long time constant, so that the change of the torque of the engine due to the change of the ignition timing can be effectively prevented. Moreover, in a case where the knocking is extinguished, the ignition timing returns with the engine cooled, so that the frequent knocking can be significantly reduced, thus improving the durability of the engine and realizing an inexpensive knock control system.

BRIEF DESCRIPTION OF THE DRAWINGS

For a better understanding of the present invention, the following description is made with reference to the drawings in which.

DESCRIPTION OF THE PREFERRED EMBODIMENTS

A preferred embodiment of the present invention will become understood from the following detailed description referring to the accompanying drawings.

Figure 1:
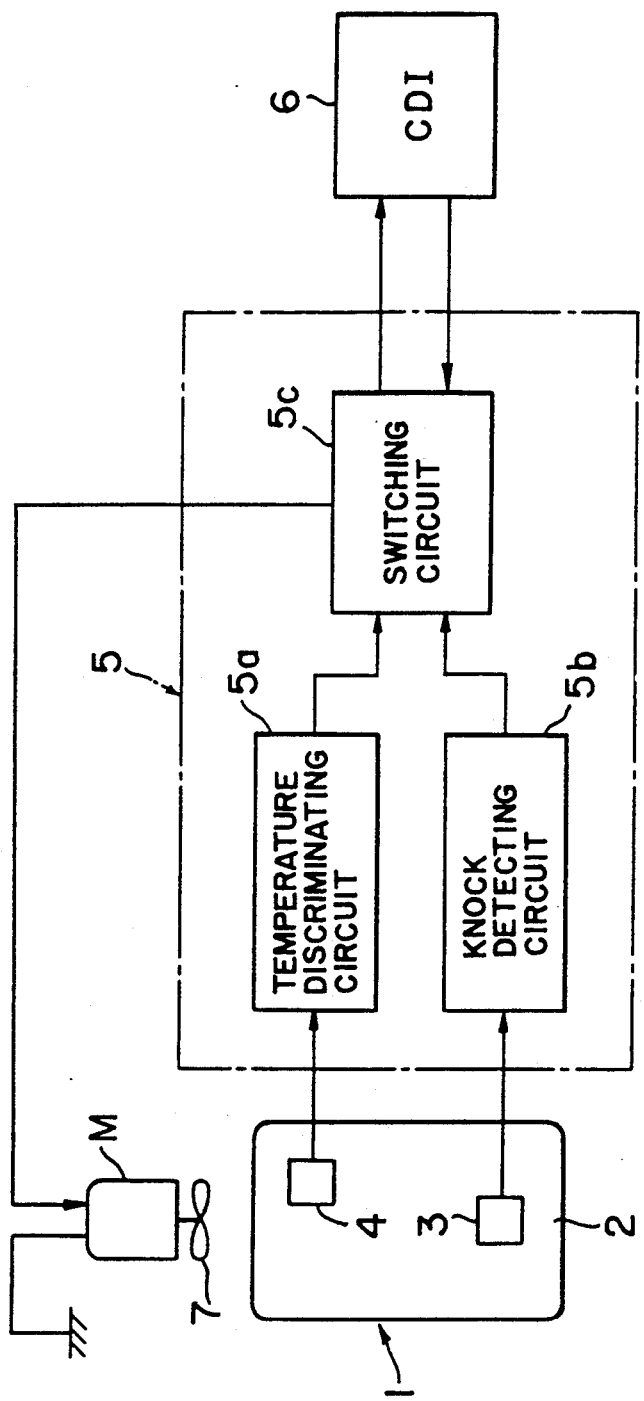
FIG. 1 is a schematic block diagram of an engine knock control system according to the present invention.

Referring to FIG. 1, a two-cycle engine unit 1 is provided with a cylinder block 2 to which a knock sensor 3 is secured. A temperature sensor 4 is also arranged to the cylinder block 2, and the knock sensor 3 and the temperature sensor 4 are connected to an ignition control system 5.

The ignition control system 5 includes a temperature discriminating circuit 5a to which the temperature sensor 4 is connected, a knock detecting circuit 5b to which the knock sensor 3 is connected and a switching circuit means 5c.

The ignition control system 5 is further connected to an ignition device comprising a capacitive discharge type ignition unit (CDI) 6 and connected to a motor M of an electric fan 7 arranged in front of the engine unit 1.

Figure 2:
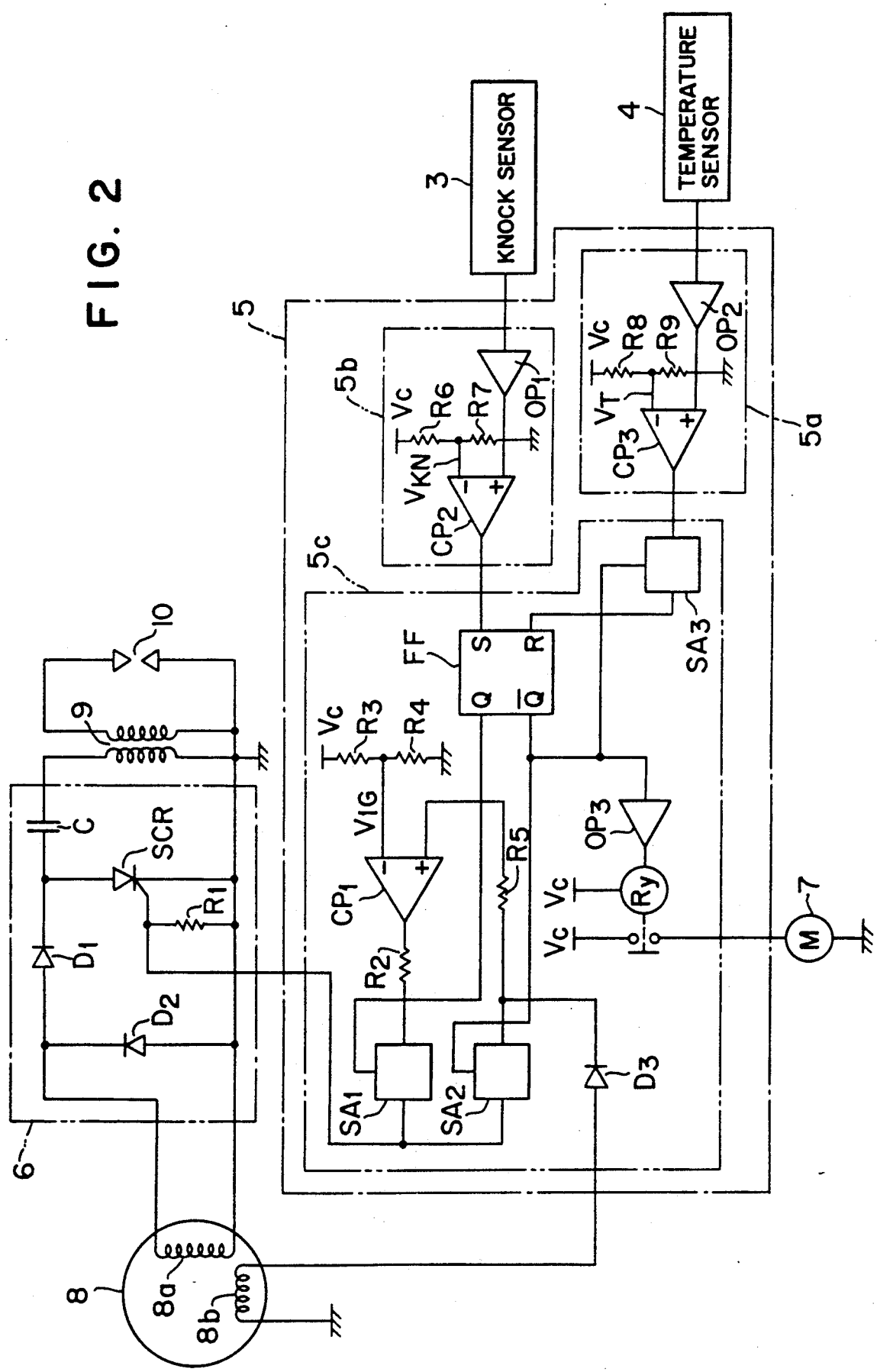
FIG. 2 is a circuit diagram of an ignition control means of the engine knock control system shown in FIG. 1.

FIG. 2 is a circuit diagram representing the detail of the ignition control system 5 with the associated circuit or elements. Referring to FIG. 2, the switching circuit 5c is composed of a flip-flop FF, analog switches SA1, SA2 and SA3, a comparator CP1, an amplifier OP3, a diode D3, a relay RY, and resistors R2, R3, R4 and R5. Output sides of the analog switches SA1 and SA2 controlled by the flip-flop FF are mutually connected and then connected to the CDI 6.

A retard reference angle voltage VIG, described later, potentially divided from a power source VC by the resistors R3 and R4 is applied to a reversed input terminal of the comparator CP1. On the other hand, a non-reversed input terminal of the comparator CP1 is connected to an input side of the analog switch SA2 through the resistor R5.

The flip-flop FF has a Q output connected to the control terminal of the analog switch SA1 and a $\overline{Q}$ output is connected to control terminals of the analog switches SA2 and SA3 and also to an input side of the amplifier OP3.

A set terminal of the flip-flop FF is connected to a comparator CP2 of the knock detecting circuit 5b composed of the comparator CP2, an amplifier OP1, and resistors R6 and R7. A reset terminal of the flip-flop FF is connected through the analog switch SA3 to a comparator CP3 of the temperature discriminating circuit 5a composed of the comparator CP3, an amplifier OP2 and resistors R8 and R9.

The CDI 6 is of the known structure composed of switching elements such as diodes D1 and D2, a capacitor C and a thyristor SCR and a resistor R1. An exciter coil 8a of a magneto 8 generating an A.C. output synchronous with the rotation of the engine is connected to a primary side of the ignition coil 9 through the CDI 6. A gate of the thyristor SCR is connected to the output sides of the analog switches SA1 and SA2 of the switching circuit 5c and an ignition plug 10 is connected to a secondary side of the ignition coil 9.

The magneto 8 is equipped with a reference signal generation means such as a pulser coil 8b generating a reference signal VS at a predetermined crank angle in synchronous with the rotation of the engine. The pulser coil 8b is connected through the diode D3 to the input side of the analog switch SA2 of the switching circuit 5c and is also connected through the diode D3 and the resistor R5 to the non-reversed input terminal of the comparator CP1 of the switching circuit 5c.

The knock control operation by means of the knock control system of the construction described above will operate in the following manner.

The ignition control system 5 is first reset at the engine starting time. Then, the Q output of the flip-flop FF is made "low" and the $\overline{Q}$ output thereof is made "high", and the analog switch SA2 is made "ON".

In the next step, when the engine becomes in a cranking condition, the A.C. voltage generated by the exciter coil 8a of the magneto 8 is subjected to half-wave rectification by the diode D2 to thereby charge the capacitor C of the CDI 6.

The reference signal VS is then output at the predetermined crank angle from the pulser coil 8b of the magneto 8 and the reference signal voltage VS is applied to the gate of the thyristor SCR through the diode D3 and the analog switch SA2.

When the reference signal voltage VS reaches a trigger level of the thyristor SCR, the thyristor SCR is turned-on. In this instance, the charge in the capacitor C is instantaneously discharged in the closed circuit composed of the capacitor C, the thyristor SCR, the primary side of the ignition coil 9, which is connected to the capacitor C, whereby a high voltage having an extremely large build-up is caused in the secondary side of the ignition coil 9, thus sparking the ignition plug 10.

When the knocking is generated due to the engine temperature rising during the operation of the engine by means of the CDI 6, the vibration due to the knocking transferred to the cylinder block is detected by the knock sensor 3.

The signal from the knock sensor 3 is input into the comparator CP2 through the amplifier OP1, in which the signal is compared with a knock discrimination reference voltage VKN determined by the resistors R6 and R7. In the comparison, when the signal from the knock sensor 3 exceeds the knock discrimination reference voltage VKN, the output of the comparator CP2 becomes a high level. At this moment, the output of the flip-flop FF is reversed and the $\overline{Q}$ output is made "low" and the Q output is made "high". Then, the analog switches SA1 and SA3 are made "ON" and the analog switch SA2 is made "OFF", and the relay RY is made "ON" through the amplifier OP3 to thereby close a contact of the relay RY.

According to the manner described above, the electric fan 7 is driven and the engine is cooled. The reference signal voltage VS input from the pulser coil 8a of the magneto 8 by means of the comparator CP1 is compared with the retard reference voltage VIG determined by the resistors R3 and R4. In the comparison, when the reference signal voltage VS exceeds the retard reference voltage VIG, the trigger signal is applied to the gate of the thyristor SCR through the resistor R2 and the analog switch SA1.

The retard reference voltage VIG is set to a value larger than the trigger level of the thyristor. For this reason, the timing for turning on the thyristor SCR is delayed from the timing to be turned on by the reference signal voltage VS through the analog switch SA2 and, hence, the ignition timing is retarded.

In a case where the signal from the temperature sensor 4 to be input into the comparator CP3 through the amplifier OP2 is larger than the temperature reference voltage VT determined by the resistor R8 and R9, that is, where the engine temperature is larger than the predetermined temperature, the flip-flop FF is not reset and the ignition timing is maintained with a retarded angle.

When the engine temperature is lowered to a value below the predetermined temperature, the high output signal is input from the comparator CP3 into the reset terminal of the flip-flop FF through the analog switch SA3 to thereby reset the flip-flop FF. Then, the analog switch SA1 is made "OFF" and the analog switch SA2 is made "ON", whereby the ignition timing returns to the timing in response to the reference signal input from the pulser coil 8b.

Namely, when the knocking is generated, the ignition timing is immediately retarded and, thereafter, even if the knocking is extinguished, the ignition timing does not immediately return to the normal state and the ignition timing is maintained with the retarded angle when the temperature of the cylinder block reaches the predetermined temperature, whereby the frequent repetition of the retard and advance of the ignition timing due to the temperature of the cylinder block of the engine having long time constant can be prevented.

Accordingly, a condition that the ignition timing advances in angle at the same time when the knocking is extinguished with the high temperature of the engine and the frequency of the generation of knocking can be significantly reduced. Moreover, the torque change of the engine due to the change of the ignition timing can be also prevented.

While the presently preferred embodiment of the present invention has been shown and described, it is to be understood that this disclosure is for the purpose of illustration and that various changes and modifications may be made without departing from the scope of the invention as set forth in the appended claims.

I claim:

1. A system for controlling knocking in an engine, comprising:
   means for generating a reference signal in synchronous with a rotation of the engine;
   ignition means responsive to the reference signal for controlling electric supply to an ignition coil of the engine to ignite the engine;
   a knock sensor for detecting knocking of the engine;
   a temperature sensor for detecting temperature of the engine; and
   ignition control means for maintaining an ignition timing at a second angle retarded with respect to the reference signal from said reference signal generating means when the knocking in the engine is detected by said knock sensor and for returning the ignition timing to a first angle corresponding to the reference signal when the temperature of the engine becomes below a predetermined temperature.

2. The system according to claim 1, wherein said ignition control means comprises:
   a temperature discriminating circuit provided to discriminate that the temperature of the engine is higher than a predetermined value to produce a discriminating signal;
   a knock determining circuit provided to produce a knocking occurrence signal when an output signal from the knock sensor exceeds a set value; and
   a switching circuit provided to switch the ignition timing from the first angle to said second angle in response to the discriminating signal and the knocking occurrence signal.

3. The system according to claim 1, wherein said reference signal generating means is a magneto including an exciter coil for producing power to the ignition means and a pulser coil for generating the reference signal in response to the rotation of the engine.

4. The system according to claim 3, wherein said ignition means includes a capacitive discharge ignition unit with a capacitor and a switching element.

5. The system according to claim 4, wherein said capacitive discharge ignition unit includes:
   a capacitor provided to charge the power from the exciter coil; and
   a switching element provided to discharge the power of the capacitor in a closed circuit composed of the capacitor, the switching element and the ignition coil.

6. The system according to claim 5, wherein said switching element includes a thyristor.

* * * * *